(12) United States Patent
Wu (10) Patent No.: US 11,211,985 B2
(45) Date of Patent: Dec. 28, 2021

(54) NETWORK OPERATION

(71) Applicant: Samsung Electronics Co., Ltd., Suwon-si (KR)

(72) Inventor: Shangbin Wu, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/472,803

(22) PCT Filed: Dec. 21, 2017

(86) PCT No.: PCT/KR2017/015195
§ 371 (c)(1),
(2) Date: Jun. 21, 2019

(87) PCT Pub. No.: WO2018/117666
PCT Pub. Date: Jun. 28, 2018

(65) Prior Publication Data
US 2020/0195328 A1   Jun. 18, 2020

(30) Foreign Application Priority Data
Dec. 22, 2016   (GB) ..................................... 1621953

(51) Int. Cl.
*H04B 7/06* (2006.01)
*H04B 7/024* (2017.01)
*H04L 5/00* (2006.01)

(52) U.S. Cl.
CPC ........... *H04B 7/0626* (2013.01); *H04B 7/024* (2013.01); *H04B 7/0632* (2013.01);
(Continued)

(58) Field of Classification Search
CPC .... H04B 7/0626; H04B 7/024; H04B 7/0632; H04B 7/0639; H04L 5/0048; H04L 5/0057
(Continued)

(56) References Cited

U.S. PATENT DOCUMENTS

2012/0207055 A1   8/2012   Kang et al.
2013/0003788 A1*  1/2013   Marinier ............. H04B 7/0626
                                                          375/219
(Continued)

FOREIGN PATENT DOCUMENTS

KR   10-2013-0016701 A   2/2013
WO   2011050755 A1       5/2011
(Continued)

OTHER PUBLICATIONS

ISA/KR, "International Search Report and Written Opinion of the International Searching Authority," Application No. PCT/KR2017/015195, dated Apr. 10, 2018, 10 pages.
(Continued)

*Primary Examiner* — Kwang B Yao
*Assistant Examiner* — Xuan Lu (57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Disclosed is a method of operating a telecommunication network where a User Equipment, UE, is in communication with a plurality of cells, including a serving cell and a plurality of non-serving cells, wherein the UE is operable to determine an indicator which is passed to the serving cell, such that the serving cell determines which of the plurality of cells are operable in either coherent joint transmission, JT, mode or non-coherent joint transmission, NCJT mode.

12 Claims, 8 Drawing Sheets

(52) U.S. Cl.
CPC ......... *H04B 7/0639* (2013.01); *H04L 5/0048* (2013.01); *H04L 5/0057* (2013.01)

(58) Field of Classification Search
USPC ........................................................ 370/329
See application file for complete search history.

(56) References Cited

U.S. PATENT DOCUMENTS

| | | |
|---|---|---|
| 2013/0114656 A1 | 5/2013 | Sayana et al. |
| 2013/0250876 A1 | 9/2013 | Hugl et al. |
| 2013/0308590 A1* | 11/2013 | Ihm .................. H04B 7/0632 370/329 |
| 2014/0022924 A1* | 1/2014 | Cili .................. H04W 24/08 370/252 |
| 2014/0050202 A1* | 2/2014 | Baligh ............. H04W 72/1226 370/336 |
| 2014/0071841 A1 | 3/2014 | Hu et al. |
| 2014/0369291 A1* | 12/2014 | Zhang ............... H04B 7/0626 370/329 |
| 2015/0195071 A1 | 7/2015 | Lunttila et al. |
| 2016/0006487 A1* | 1/2016 | Ding .................. H04B 7/024 370/329 |
| 2016/0081082 A1* | 3/2016 | Cao .................. H04W 28/16 370/329 |
| 2016/0157118 A1* | 6/2016 | Liu .................. H04L 1/203 370/252 |
| 2019/0124631 A1* | 4/2019 | Ren .................. H04W 72/0466 |
| 2019/0150011 A1* | 5/2019 | Shoji ............... H04L 5/005 370/329 |

FOREIGN PATENT DOCUMENTS

| | | |
|---|---|---|
| WO | 2013022266 A2 | 2/2013 |
| WO | 2013038609 A1 | 3/2013 |
| WO | 2018117666 A1 | 6/2018 |

OTHER PUBLICATIONS

MCC Support, "Draft Report of 3GPP TSG RAN WG1 #86bis v0.1.0," R1-16xxxxx, 3GPP TSG RAN WG1 Meeting #87, Reno, US, Nov. 14-18, 2016, 160 pages.

Intellectual Property Office (UK), "Examination Report under Section 18(3)," Application No. GB1621953.7, dated Sep. 9, 2019, 2 pages.

* cited by examiner

NETWORK OPERATION

CROSS-REFERENCE TO RELATED APPLICATIONS

This application is a 371 National Stage of International Application No. PCT/KR2017/015195, filed Dec. 21, 2017, which claims priority to United Kingdom Patent Application No. GB 1621953.7, filed Dec. 22, 2016, the disclosures of which are herein incorporated by reference in their entirety.

BACKGROUND

1. Field

The present invention relates to improvements in coordination of various network elements in a telecommunication network. In particular, it concerns the coordination of entities employing coherent and non-coherent joint transmission (JT/NCJT).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Problems associated with network coordination are under discussion in various telecommunication standardisation forums. Coordinated multi-point (CoMP), a technique for network coordination to increase performance, especially at the cell edge within the evolution of LTE-Advanced for Release 11 or beyond, is expected to play a major role in the $3^{rd}$ Generation Partnership Project (3GPP) New Radio (NR) network coordination in $5^{th}$ Generation (5G) cellular systems.

A key transmission scheme, known as coherent joint transmission (JT), allows multiple transmission points (TPs) to exchange data and preceding information to form multi-user multiple-input multiple-output (MU-MIMO) transmission. Further, a 3GPP standardisation forum is studying further enhancements on CoMP (FeCoMP) to explore the feasibility of non-coherent JT (NCJT), which does not require TPs to exchange data or preceding information. In this scenario, signalling overhead can be minimized such that NCJT is more favourable in non-ideal backhauling scenarios i.e. situations with limited data rate in the backhaul.

Coherent JT and NCJT are expected to form the basis of NR network coordination. However, the coexistence of both coherent JT and NCJT has not been considered and poses problems.

SUMMARY

Embodiments of the present invention aim to address problems in the prior art, whether mentioned herein or not. In particular, embodiments of the invention seek to improve network performance by coordinating coherent JT and NCJT network elements, such as base stations (BS).

According to the present invention there is provided an apparatus and method as set forth in the appended claims. Other features of the invention will be apparent from the dependent claims, and the description which follows.

Embodiments of the present invention provide a new type of user equipment (UE) measurement to assist TPs such as BSs to decide which coordinated cells will operate in coherent JT mode and which coordinated cells will operate in NCJT mode. Provision of this new measurement allows the UE to feedback information to its serving cell to coordinate non-serving cells to ensure that an optimum mixture of coherent JT and NCJT is used in any given scenario.

The combination of coherent JT and NCJT offers improved network performance. Coherent JT is well known in the art. Recent work has studied NCJT. Without the need of exchange data or preceding information between TPs, NCJT is more suitable for scenarios when ideal backhauling is not available. Also, when different codewords are assigned to different TPs, NCJT allows that these different codewords are transmitted in non overlapped physical resource blocks (PRBs). This provides more flexibility than conventional coherent JT.

Based on current understandings of the standardisation process, it is expected that new network coordination schemes will be proposed and studied and a Channel State Information (CSI) report from the User Equipment (UE) will be generated based on interdependency between various CSI. This enhancement has the potential to use the implicit information across different CSI reference signal (CSI-RS) resources.

Various embodiments of the present disclosure provide an improved system performance.

DETAILED DESCRIPTION

Figure 1:
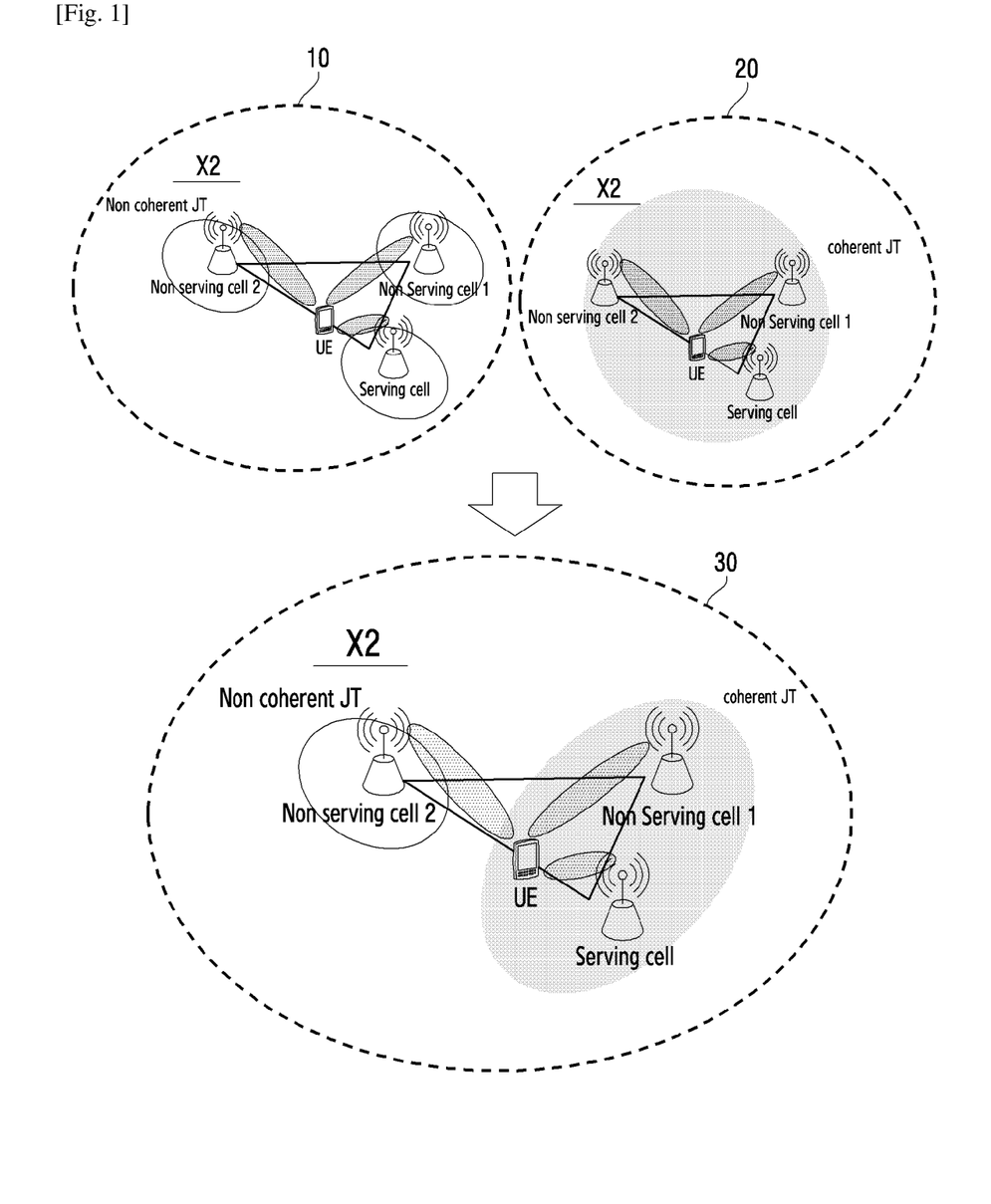
FIG. 1 shows a combination of a non-coherent setup of base stations (BSs) with a coherent setup of BSs.

FIG. 1 shows conceptually the combination of a non-coherent setup 10 of BSs with a coherent setup 20 of BSs to yield a hybrid setup 30 featuring both coherent and non-coherent elements.

Each setup 10, 20, 30 shows a target UE together with a serving cell and a plurality of non-serving cells. In the non-coherent setup 10, there is an X2 backhaul connection between each cell, shown by the solid line connecting each cell, but there is no or little coordination between the cells, and the UE is primarily served by the serving cell. However, it may be possible that a voice call, for instance, is served by the serving cell, whereas data traffic is served by the so-called non-serving cells.

In the coherent setup 20, there is a high degree of coordination between the serving cell, which acts as a master and the so-called non-serving cells.

The benefit of coherent JT, as in setup 20, is that BSs with large interference to the target UE can cooperate together to mitigate interference. However, coherent JT requires large data exchange among cooperative BSs and responsive backhauling conditions, which may not always be available in practice. This overhead may not be acceptable and is usually not desirable when backhauling is not ideal.

NCJT does not require large data exchange between BSs and therefore it is more suitable when the backhauling condition is not ideal. The backhauling conditions vary widely in reality. The combination of coherent JT and NCH can maximize the use of various backhauling conditions of cooperative BSs, but this hybrid approach introduces other difficulties, which embodiments of the present invention seek to address.

Unlike coherent JT where identical data is being transmitted by multiple cells, in NCJT, it is possible that different cells transmit different data. One consequence of transmitting different data from different cells is that there is no need to keep the PRB allocation identical between multiple cells as in NCJT. Therefore, combining coherent JT and NCJT allows more flexible PRB allocations to NCJT cells according to channel conditions. This maximizes the use of frequency diversity to enhance data rate.

Figure 2A:
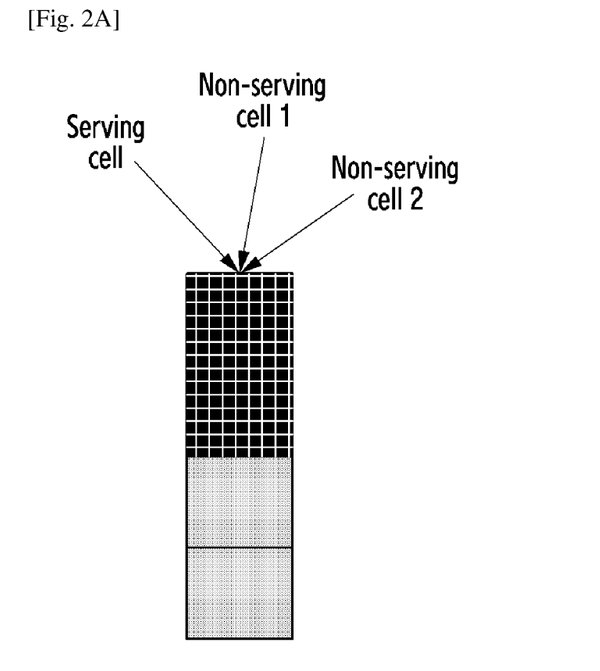
FIG. 2A shows physical resource block (PRB) allocation in a coherent joint transmission (JT) setup.
Figure 2B:
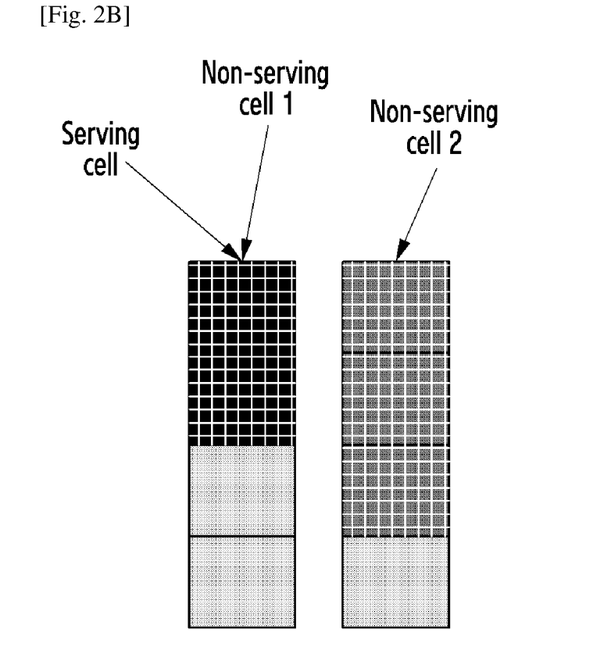
FIG. 2B shows a PRB allocation in hybrid setup.

This is illustrated in FIGS. 2A and 2B. FIG. 2A shows PRB allocation in a coherent JT setup. The upper shaded squares represent commonly assigned PRBs, which are necessarily identical for the serving cell and the two non-serving cells shown in setup 20 in FIG. 1. FIG. 2B shows a PRB allocation in hybrid setup 30, whereby the PRB allocation in non-serving cell 2 differs from the PRB allocation in the serving cell and the other non-serving cell.

The serving cell works as a central node. When a UE senses that two non-serving cells have high spatial correlation, these non-serving cells should work in the coherent JT mode. Otherwise, they may have strong interference to each other. When a UE senses that the channels from certain non-serving cells are changing rapidly, these non-serving cells should work in the NCJT mode. Otherwise, the mismatch between the precoder and channel may cause significant data rate loss.

Figure 3:
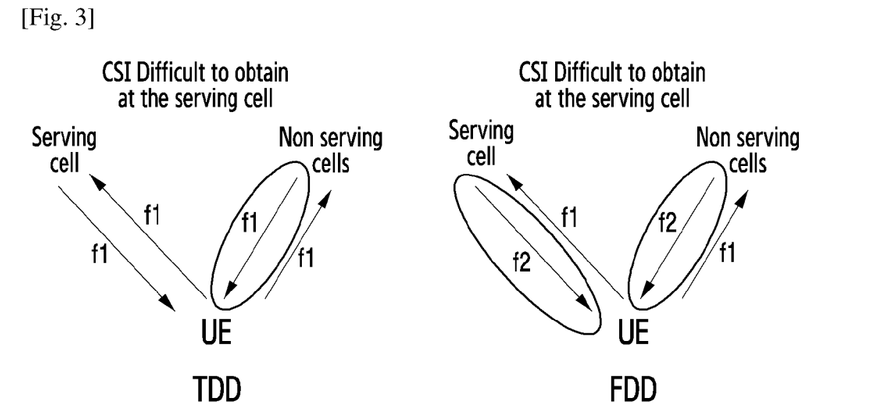
FIG. 3 shows graphically a problem in both time division duplexing (TDD) and frequency division duplexing (FDD) modes.

The serving cell makes radio resource management decisions on the JT modes of non-serving cells relying on the Channel State Information messages (CSIs) in the downlink. However, it is difficult for the serving cell to obtain CSIs between non-serving cells and the target UE in Tim Division Duplex (TDD) mode. Although this can be potentially solved by exchanging CSI among cooperative cells, a potentially large overhead, in terms of signaling and data transfer, will be introduced. On the contrary, obtaining CSI at the serving cell in Frequency Division Duplex (FDD) mode will be even more challenging as the downlink and uplink operate at different frequencies. This is illustrated in FIG. 3, which shows, graphically, the problem in both TDD and FDD modes.

Therefore, it is difficult for the serving cell to decide which non-serving cells should use coherent JT triode. As a result, embodiments of the present invention utilize a measurement report from the UE and a corresponding signaling procedure to assist the serving cell to decide which cells should operate in the coherent IT mode and which cells should operate in the NCJT mode. Additionally, the measurement report can work in both TDD and FDD modes of NR network coordination.

Figure 4:
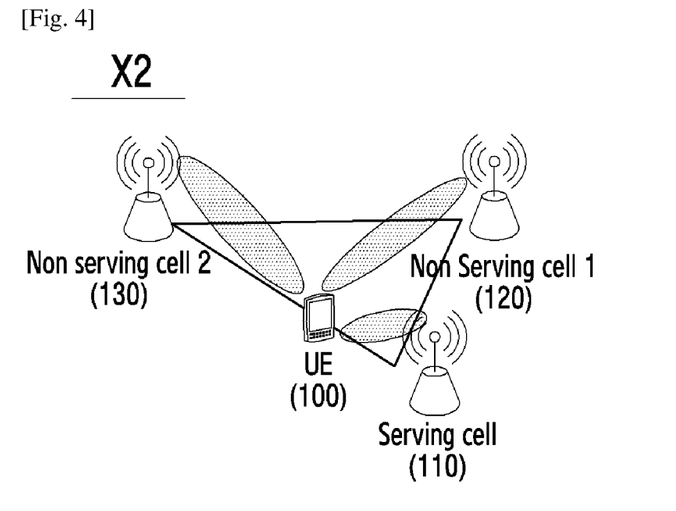
FIG. 4 shows a general network structure.

FIG. 4 shows a general network structure. The serving cell 110 assigns port indices to other non-serving cells 120, 130, through which non-serving cells transmit CSI-RS on those assigned ports. After receiving CSI-RS on various ports, the UE 100 generates a measurement report called "coherent JT indicator". The "coherent JT indicator" is fed back to the serving cell 110 to help the serving cell 110 decide the set of non-serving cells 120, 130 for coherent JT.

Two different ways of generating the "coherent JT indicator" are described in the following, but it is to be noted that these are exemplary only and other techniques may be used, as required. One is based on the correlation between different antenna ports, which can provide spatial information of antenna ports to boost throughput. The other one is based on the autocorrelation of the same antenna ports, which can provide temporal information of antenna ports to maintain link reliability. Then, the serving cell 110 can pass signaling or data to the indicated non serving cells to perform coherent JT and the non-indicated non-serving cells can operate in NCJT mode. The UE may decide how to generate the coherent JT indicator, depending on the particular circumstances and/or its condition. In this way, the mode of operation (i.e. coherent or non-coherent) is determined based on the measurement report "coherent JT indicator".

It should be noted that there is an existing indicator, called CSI-IM (inter-cell interference measurement) in current LTE standards, but this relates only to interference power level and lacks some of the information which is required and provided by embodiments of the present invention. As such, it is not suitable for present purposes.

Turning, again to FIG. 4, consider a typical coordinated network structure in NR where a UE 100 is attached to a serving cell 110. The serving cell 110 as well as multiple non serving cells 120, 130 are serving this UE 100 in a coordinated manner. Connections between cells are achieved via X2 interfaces, shown by the solid lines connecting the cells. Also, shared data and signaling between cells can be interchanged via these X2 interfaces.

Figure 5:
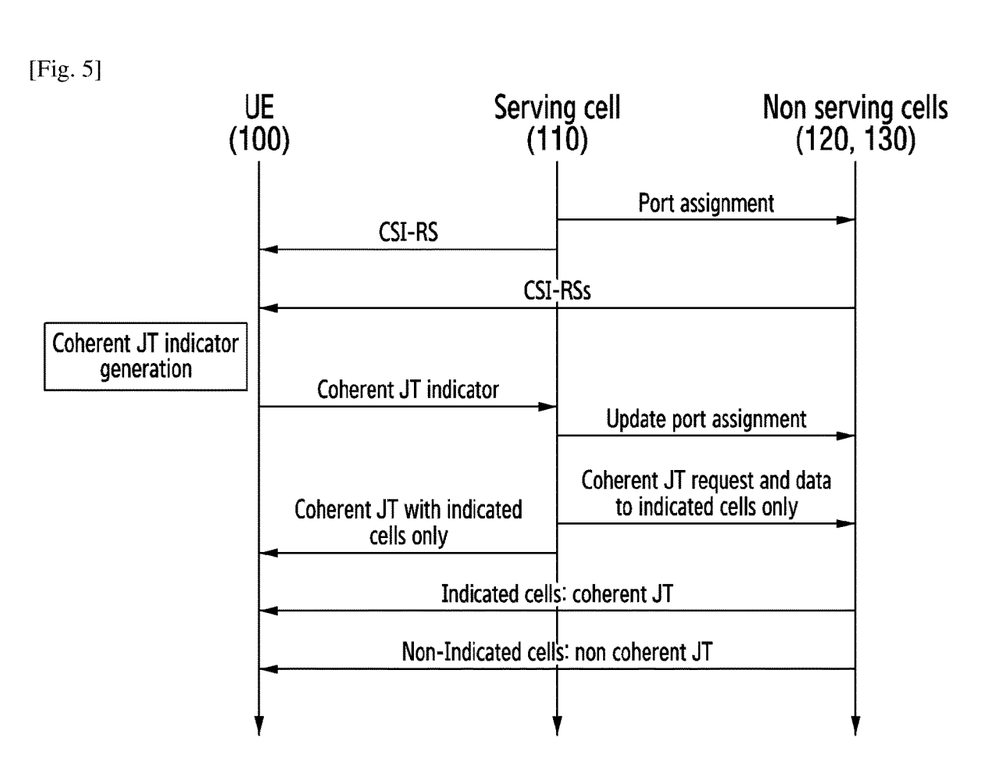
FIG. 5 shows a general procedure of a user equipment (UE) assisting the serving cell to decide the set of non-serving cells for coherent JT.

The general procedure of the UE 100 assisting the serving cell 110 to decide the set of non-serving cells for coherent JT is described in FIG. 5. To begin with, the serving cell 100 sends an initial CSI-RS port assignment to all non-serving cells 120, 130, signaling on which port a non-serving cell should transmit its CSI-RS. Then, the UE 100 will receive CSI-RSs from all cells 110, 120, 130 and perform measurement and estimate channels on those antenna ports. Next, the UE 100 generates the coherent JT indicator, which is bitmap and carries an indication of the set of favorable non-serving cells 120, 130 for coherent JT transmission. The coherent JT indicator is fed back to the serving cell 110 from the UE 100. On the basis of the coherent JT indicator's help, the serving cell 110 sends an updated port assignment to all non-serving cells 120, 130 to inform them their antenna port indices. Moreover, coherent JT requests and data will be sent to indicated cells. Finally, indicated cells perform coherent JT and non-indicated cells perform NCJT, respectively. This continues until the configuration alters, which may happen periodically or as a result of some change in channel conditions.

Figure 6:
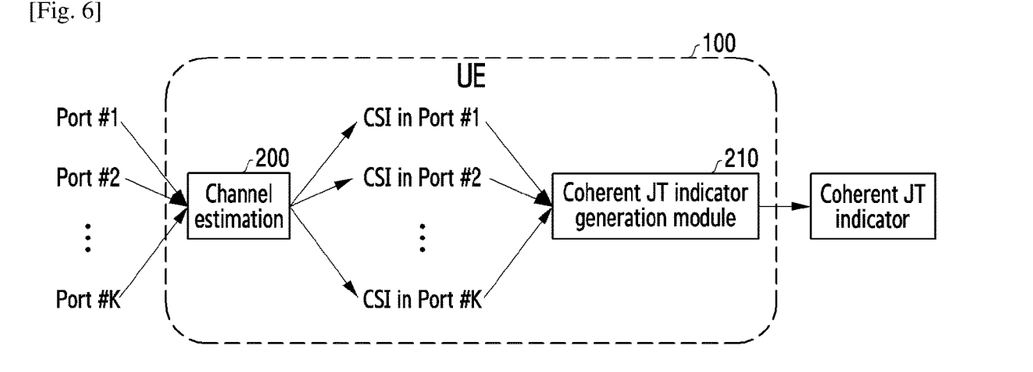
FIG. 6 shows a coherent JT Indicator generation module within the UE according to an embodiment of the present invention.

FIG. 6 shows a Coherent JT Indicator generation module 210 within a UE 100 according to an embodiment of the present invention. The module 210 receives a plurality of CSIs (#1 . . . #K) for various ports, which are output from a channel estimator 200, connected to a plurality of ports (#1 . . . #K). The output of the module 210 is the coherent JT indicator, which is sent to the serving cell 110, as mentioned above. The operation of module 210 is described later.

Figure 7:
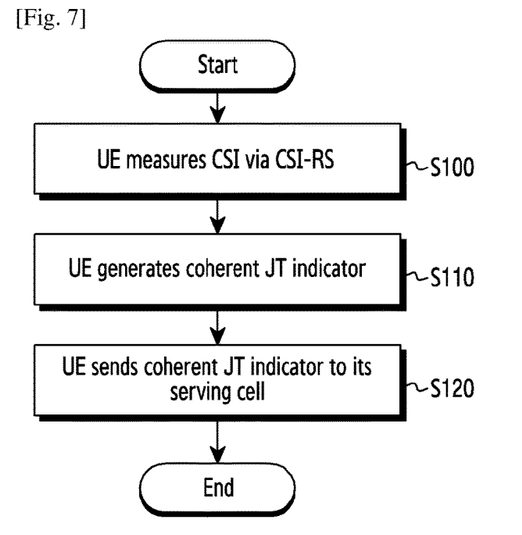
FIG. 7 shows a procedure in the UE for generating the coherent JT indicator.

The procedure in UE 100 for generating the coherent JT indicator is shown in FIG. 7. The UE first measures, at step S100, CSI-RS resources and performs channel estimation to obtain CSI. Secondly, at step S110, the UE 100 computes the coherent JT indicator based on CSI on different antenna ports. Thirdly, at step S120, the UE 100 transmits the coherent JT indicator to its serving cell 110.

Figure 8:
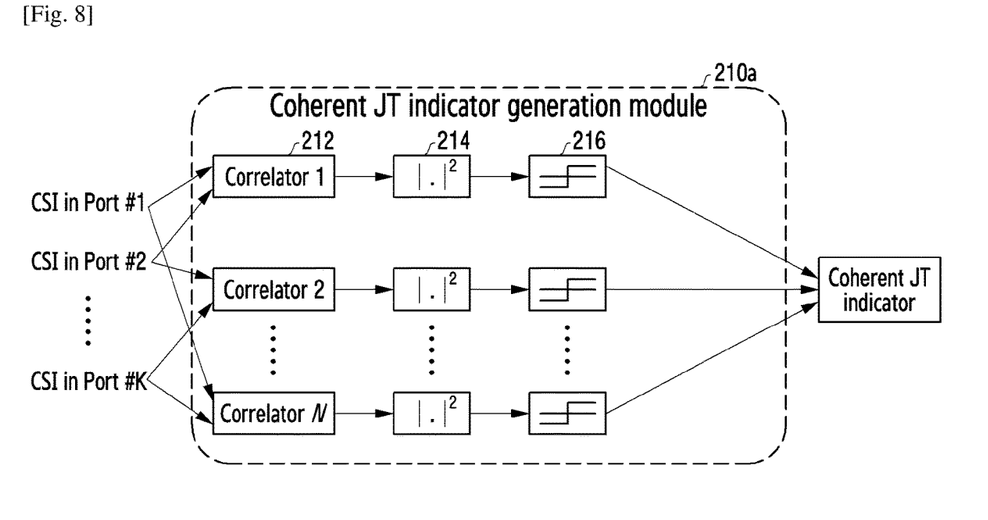
FIG. 8 shows one structure for the coherent JT indicator generation module.

FIG. 8 shows one structure for the coherent JT indicator generation module 210a, shown in FIG. 6. It comprises a set of correlators 212, squaring circuits 214, and threshold detectors 216. The coherent JT indicator is based on the correlation between different antenna ports, which can provide spatial information of antenna ports, and may be used to boost throughput. The estimated CSI on different ports (assume K ports) will be used as input to N correlators 212. The maximum number of correlators 212 can be computed as:

$$N_{max}=K(K-1)/2$$

The UE 100 selects a subset of antenna ports only according to its computation capability. After computing squared correlation coefficients, they will be subjected to a threshold test by comparing them with a predefined threshold set by the UE 100, which may be determined by e.g. what level of interference the UE can tolerate. A higher correlation coefficient suggests that inter-channel interference is more significant.

Therefore, it will be more beneficial for ports with higher correlation coefficients to operate in the coherent JT mode. On the other hand, a smaller correlation coefficient implies that the inter-channel interference is less significant. As a result, it will be more beneficial for ports with smaller correlation coefficients to operate in the NCJT mode.

Figure 9:
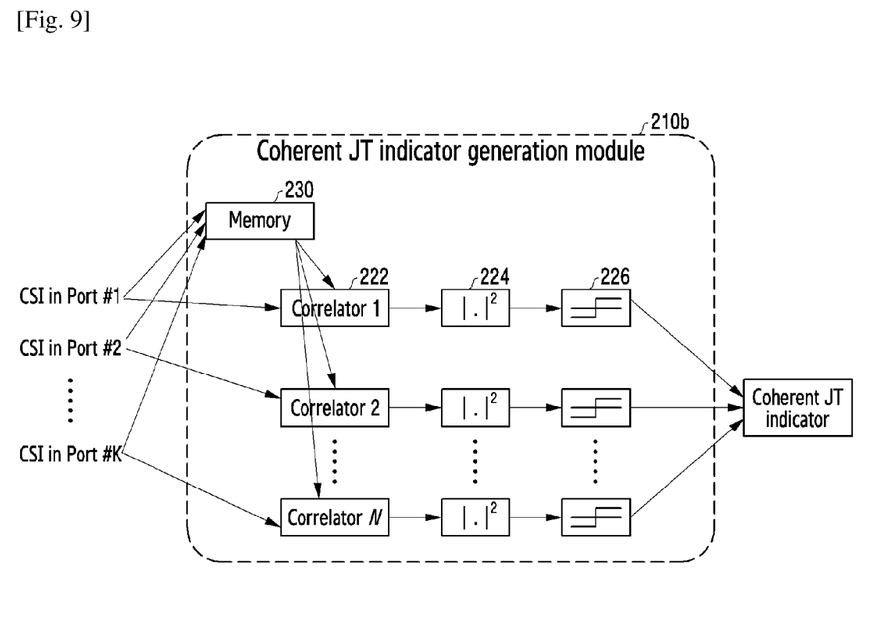
FIG. 9 shows another structure for the coherent JT indicator generation module.

FIG. 9 shows another structure for the coherent JT indicator generation module 210b shown in FIG. 6. It comprises a memory module 230, a set of correlators 222, squaring circuits 224, and threshold detectors 226. The coherent JT indicator produced is based on the correlation of the same antenna port between different time instants, which can provide temporal information of antenna ports to maintain link reliability. The estimated CSI on different ports (assume K ports) will be fed into the memory module 230 for storage. Meanwhile, the estimated CSI on different ports at the current time instant and the estimated CSI of the past instant stored in the memory module will be used as input to N correlators 222. The maximum number of correlators can be computed as:

$$N_{max}=K$$

The UE 100 selects a subset of antenna ports only according to its computation capability. After computing squared correlation coefficients, they will be subjected to a threshold test by comparing them with a predefined threshold set by the UE 100, which may be determined by e.g. what level of interference the UE can tolerate. A higher correlation coefficient suggests that the channel change is less significant. Therefore, it will be more beneficial for ports with higher correlation coefficients to operate in the coherent JT mode. On the other hand, a smaller correlation coefficient implies that the channel change is more significant. As a result, it will be more beneficial for ports with smaller correlation coefficients to operate in the NCJT mode.

FIGS. 8 and 9 illustrate two particular examples for implementing module 210. The UE may implement only one of these or it may include the option to implement one or the other, depending on circumstances. Alternatively, a different approach may be adopted, as required.

Figure 10:
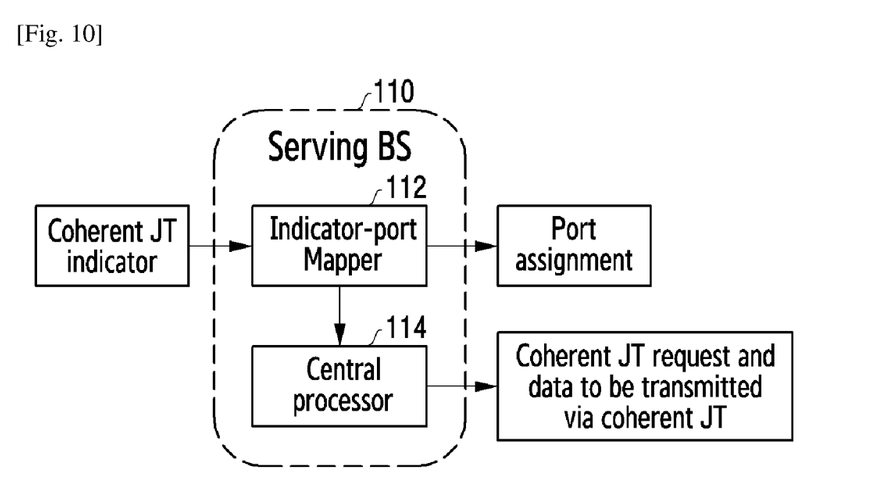
FIG. 10 shows some features of the serving BS for supporting the coherent JT indicator feature of embodiments of the present invention.

FIG. 10 shows some features of the serving BS 110 for supporting the coherent JT indicator feature of embodiments of the present invention. An indicator-port mapper 112 and a central processor 114 are provided in the serving BS 110. The function of the indicator-port mapper 112 is to map the received coherent JT indicator to port indices. The port indices serve as inputs to the central processor 114 and are sent to non-serving cells 120, 130. The central processor 114 then sends coherent JT requests and data to be transmitted via coherent JT to non-serving cells indicated by the coherent JT indicator.

Figure 11:
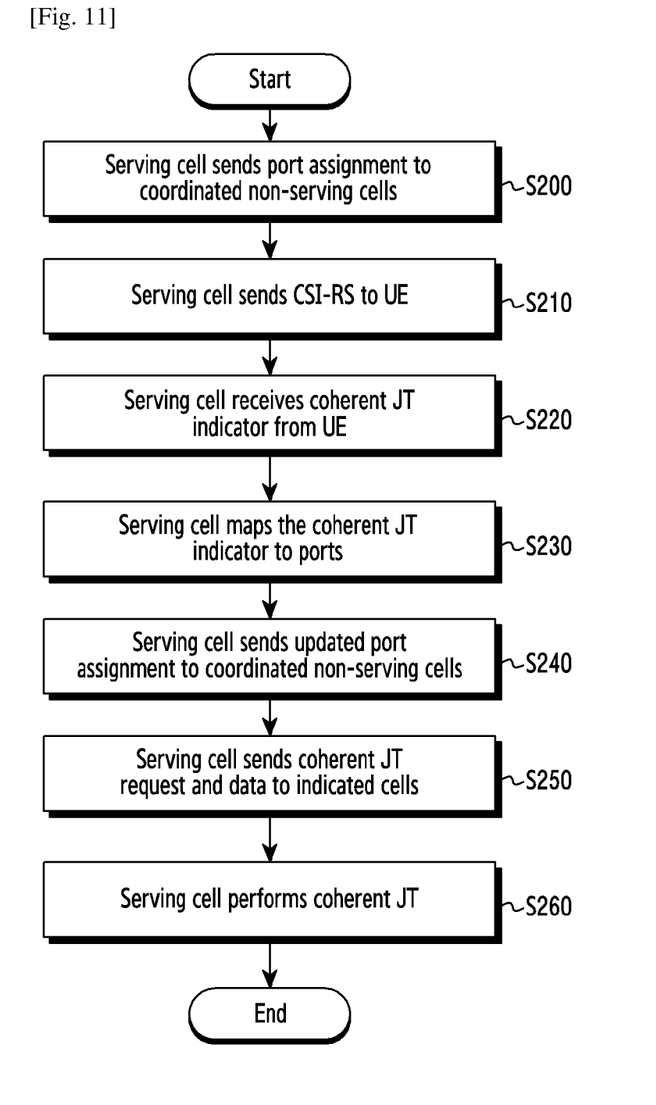
FIG. 11 shows the serving cell procedure for supporting coherent JT indicator.

The serving cell procedure for supporting coherent JT indicator is shown in FIG. 11. The serving cell, at step S200, first sends port assignment to coordinated non-serving cells. Secondly, at step S210, the serving cell transmits CSI-RS to the UE 100. After receiving, at step S220, the coherent JT indicator from the UE 100, the serving cell, at step S230, maps the coherent JT indicator to decide which non-serving cells will be in the coherent JT mode. At step S240, the serving cell 110 sends updated port assignments to coordinated non-serving cells. At step S250 the serving cell 110 transmits coherent H requests and data to indicated non-serving cells. Finally, at step S260, the serving cell performs coherent H.

Figure 12:
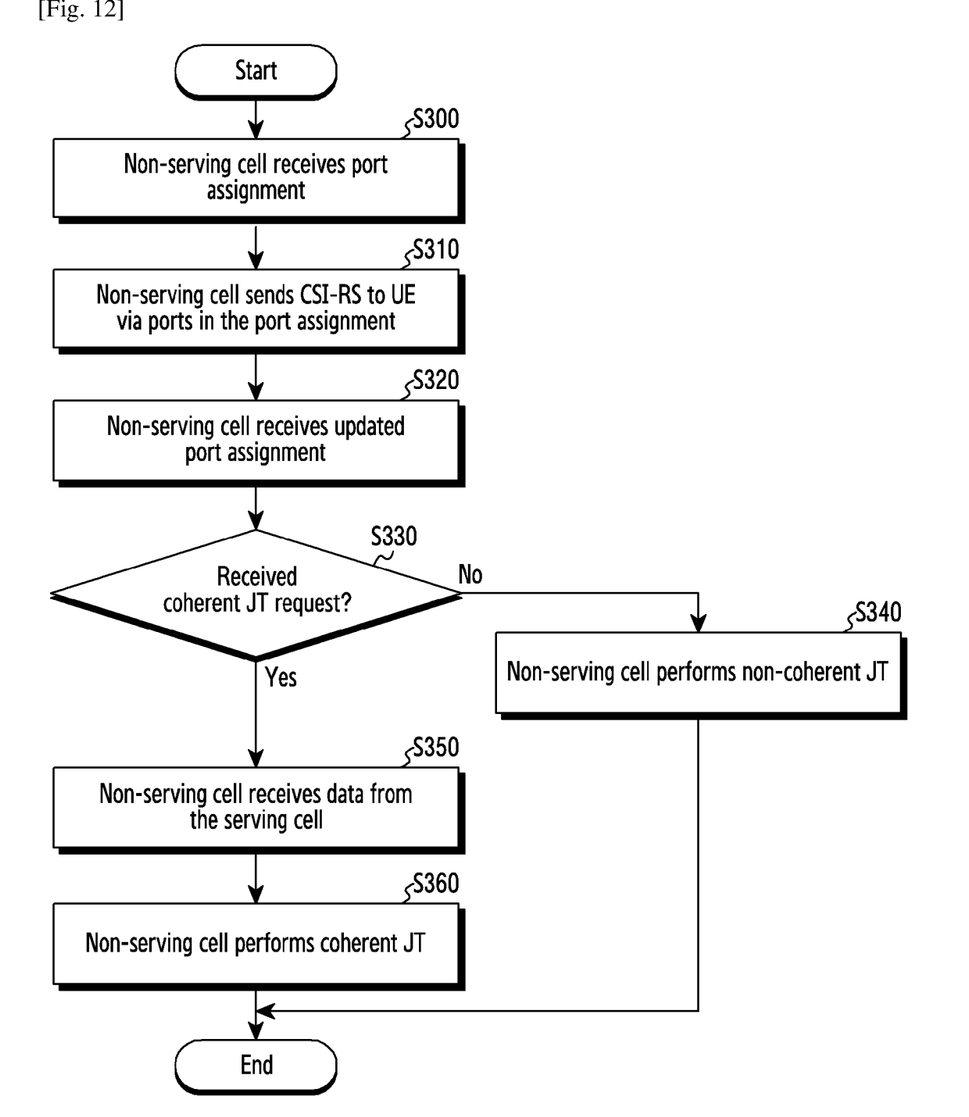
FIG. 12 shows the non-serving cell procedure for supporting coherent JT indicator.

The non-serving cell procedure for supporting coherent JT indicator is shown in FIG. 12. A non-serving cell 120, 130, at step S330, receives port assignment. At step S310, the non-serving cell 120, 130, transmits CSI-RS on the port according to the port assignment to the UE 100. After receiving, at step S320, the updated port assignment from the serving cell 110, the non-serving cell 120, 130, checks, at step S330, whether it has received a coherent JT request. If yes, the non-serving cell receives data, at step S350, from the serving cell and then perform2 coherent JT, at step S360 on the updated port. If no coherent JT request is received at step S330, then, the non-serving cell 120, 130 performs, at step S340, NCJT on the updated port.

It can be seen that embodiments of the present invention allow both coherent and non-coherent JT to be utilized, increasing flexibility in network topography and allowing a greater use of available network resources. The signaling overhead and extra computation required at the UE are relatively small and are more than offset by the improved network performance.

At a fundamental level, embodiments of the invention allow the combination of coherent and non-coherent JT, which was previously problematic at best, if it was even considered.

Advantageously, embodiments of the invention Maximize the use of cooperative BSs with both ideal and non-ideal backhauling conditions. They also permit flexible PRB allocation, which is more adaptive to channel conditions. This can maximize the use of frequency diversity.

Furthermore, the measurement report (coherent JT indicator) can work in both TDD mode and FDD mode. It can also be based on the correlation between different antenna ports, which can provide spatial information of antenna ports to boost throughput and/or be based on the correlation of the same antenna port between different time instants, which can provide temporal information of antenna ports to maintain link reliability.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a wireless communication system, the method comprising:
  obtaining channel state information (CSI) based on CSI reference signals (CSI-RSs) received from a serving base station (BS) and from a plurality of neighboring BSs;
  generating an indicator based on the CSI, wherein the indicator indicates at least one first BS for a coherent joint transmission (JT) with the serving BS;
  transmitting, to the serving BS, the indicator;
  receiving, from each of the serving BS and the at least one first BS, data based on the coherent JT; and
  receiving, from at least one second BS, one or more data based on a non-coherent JT (NCJT),
  wherein the plurality of neighboring BSs includes the at least one first BS and the at least one second BS, and
  wherein a first physical resource block (PRB) allocation for the at least one first BS is different from a second PRB allocation for the at least one second BS.

2. The method of claim 1, wherein the generating of the indicator comprises:
  measuring the CSI based on CSI-RSs on antenna ports of the plurality of neighboring BSs, the antenna ports determined by the serving BS; and
  generating the indicator based on the CSI.

3. The method of claim 1, wherein the generating of the indicator comprises:
  identifying correlation coefficients between the serving BS and each of the plurality of neighboring BSs based on the CSI; and
  identifying at least one correlation coefficient exceeding a first threshold among the correlation coefficients,
  wherein the at least one first BS corresponds to the at least one correlation coefficient.

4. The method of claim 1, wherein the generating of the indicator comprises:
  identifying auto-correlation coefficients of each of the plurality of neighboring BSs based on the CSI; and
  identifying at least one auto-correlation coefficient exceeding a second threshold among the auto-correlation coefficients,
  wherein the at least one first BS corresponds to the at least one auto-correlation coefficient.

5. The method of claim 1, wherein the coherent JT is a JT mode in which data and precoding information are exchanged between BSs for a JT, and
  wherein the NCJT is the JT mode in which data and precoding information are not exchanged between the plurality of neighboring BSs for the JT.

6. An apparatus for a terminal in a wireless communication system, the apparatus comprising:
  a transceiver; and
  at least one processor operatively coupled with the transceiver, wherein the at least one processor is configured to control to:
    obtain channel state information (CSI) based on CSI reference signals (CSI-RSs) received from a serving base station (BS) and from a plurality of neighboring BSs,
    generate an indicator based on the CSI, wherein the indicator indicates at least one first BS for a coherent joint transmission (JT) with the serving BS,
    transmit, to the serving BS, the indicator,
    receive, from each of the serving BS and the at least one first BS, data based on the coherent JT, and
    receive, from at least one second BS, one or more data based on a non-coherent JT (NCJT),
  wherein the plurality of neighboring BSs includes the at least one first BS and the at least one second BS, and
  wherein a first physical resource block (PRB) allocation for the at least one first BS is different from a second PRB allocation for the at least one second BS.

7. The apparatus of claim 6, wherein the at least one processor is configured to control to:
  measure the CSI based on CSI-RSs on antenna ports of the plurality of neighboring BSs, the antenna ports determined by the serving BS; and
  generate the indicator based on the CSI.

8. The apparatus of claim 6, wherein the at least one processor is configured to control to:

identify correlation coefficients between the serving BS and each of the plurality of neighboring BSs based on the CSI; and identify at least one correlation coefficient exceeding a first threshold among the correlation coefficients, wherein the at least one first BS corresponds to the at least one correlation coefficient.

9. The apparatus of claim 6, wherein the at least one processor is configured to control to:

identify auto-correlation coefficients of each of the plurality of neighboring BSs based on the CSI; and identify at least one auto-correlation coefficient exceeding a second threshold among the auto-correlation coefficients, wherein the at least one first BS corresponds to the at least one auto-correlation coefficient.

10. The apparatus of claim 6, wherein the coherent JT is a JT mode in which data and precoding information are exchanged between BSs for a JT, and wherein the NCJT is the JT mode in which data and precoding information are not exchanged between the plurality of neighboring BSs for the JT.

11. An apparatus for a base station (BS) in a wireless communication system, the apparatus comprising:

a transceiver; and at least one processor operatively coupled with the transceiver, wherein the at least one processor is configured to control to:

receive, from a terminal, an indicator generated based on channel state information (CSI), wherein the CSI is obtained based on CSI reference signals (CSI-RSs) from the BS and a plurality of neighboring BSs, and the indicator indicates at least one first BS for a coherent joint transmission (JT) with the base station, transmit, to the at least one first BS, a request for the coherent JT, and transmit, to the terminal, data with the at least one first BS based on the coherent JT, wherein the plurality of neighboring BSs includes the at least one first BS and at least one second BS, wherein the at least one second BS is used for a non-coherent JT (NCJT), and wherein a first physical resource block (PRB) allocation for the at least one first BS is different from a second PRB allocation for the at least one second BS.

12. The apparatus of claim 11, wherein the coherent JT is a JT mode in which data and precoding information are exchanged between BSs for a JT, and wherein the NCJT is the JT mode in which data and precoding information are not exchanged between the BSs for the JT.

* * * * *